US012742106B2

(12) United States Patent
Lu et al.

(10) Patent No.: US 12,742,106 B2
(45) Date of Patent: Sep. 22, 2026

(54) HEAT-CROSSLINKED POLYURETHANE ADHESIVES, A POLYURETHANE ADHESIVE FILM AND PREPARATION METHOD THEREFOR

(71) Applicant: Suzhou Lushi New Material Co., Ltd., Suzhou (CN)

(72) Inventors: Jianming Lu, Suzhou (CN); Wei Long, Suzhou (CN)

(73) Assignee: Suzhou Lushi New Material Co., Ltd., Suzhou (CN)

( * ) Notice: Subject to any disclaimer, the term of this patent is extended or adjusted under 35 U.S.C. 154(b) by 869 days.

(21) Appl. No.: 18/180,007

(22) Filed: Mar. 7, 2023

(65) Prior Publication Data

US 2023/0340310 A1 Oct. 26, 2023

(30) Foreign Application Priority Data

Apr. 24, 2022 (CN) ......................... 202210433426.0

(51) Int. Cl.
*C09J 7/35* (2018.01)
*C09J 7/10* (2018.01)
*C09J 175/04* (2006.01)

(52) U.S. Cl.
CPC ............... *C09J 175/04* (2013.01); *C09J 7/10* (2018.01); *C09J 7/35* (2018.01); *C09J 2475/00* (2013.01)

(58) Field of Classification Search
CPC ..... C09J 175/04; C09J 7/35; C09J 7/10; C09J 2475/00
See application file for complete search history.

(56) References Cited

U.S. PATENT DOCUMENTS

2012/0100316 A1* 4/2012 Yang .................. C08G 18/0866 428/32.81

FOREIGN PATENT DOCUMENTS

CN 111100592 A * 5/2020 ................ C09J 7/10
CN 112979902 A * 6/2021 ........... C08G 18/283

* cited by examiner

*Primary Examiner* — Jiangtian Xu
(74) *Attorney, Agent, or Firm* — Hawaii Patent Services; Nathaniel K. Fedde; Kenton N. Fedde

(57) ABSTRACT

In this present, a heat-crosslinked polyurethane adhesive and a polyurethane adhesive film are invented, and the preparation method is disclosed. The heat-crosslinked polyurethane adhesive comprises the following components: 100 weight parts of a first water-borne resin; 8 to 12 weight parts of a first water-borne curing agent; 8 to 12 weight parts of a second water-borne resin; 4 to 10 weight parts of a second water-borne curing agent; 0.04 to 0.1 weight parts of a catalyst; 0.1 to 0.2 weight parts of a water-borne defoaming agent. Furthermore, a water-based thickener is added to this adhesive to adjust the viscosity to between 1000 and 5000 cps, allowing the product to be used conveniently and stored for an extended period of time at 25° C. or below.

7 Claims, No Drawings

HEAT-CROSSLINKED POLYURETHANE ADHESIVES, A POLYURETHANE ADHESIVE FILM AND PREPARATION METHOD THEREFOR

TECHNICAL FIELD

The present invention is in the field of polymer adhesives and relates to a polyurethane adhesive. This invention is more particularly relates to a heat-crosslinked type of polyurethane adhesive, a polyurethane adhesive film, and the corresponding preparation method.

BACKGROUND ART

Polyurethane is a multifunctional synthetic polymer material, that is widely used in the fields of foam plastics, elastomers, coatings and adhesives due to the diversification of raw material varieties and the adjustability of molecular structure.

In the field of adhesive, water-borne polyurethane adhesive is widely used in automobile, high-speed rail, furniture, clothing, electronics and other field due to its environmental friendliness, superior bonding properties, and broad substrate adaptability. In practical applications, curing agents such as isocyanates, aziridines, carbodiimides and etc., are typically added to water-borne polyurethane dispersions to achieve excellent bonding properties, heat resistance and water resistance. After evenly stirring, the mixture is coated on the surface of substrates within the applicable period and allowed to dry completely below the activation temperature. The complete bonding is achieved through the application of pressure and heat, and the maximum strength is reached between 24~72 hours later.

However, in order to ensure the quality of the bonding, the following points must be noted: (1) the two-component system must be weighed and thoroughly mixed in accordance with a specific ratio of component A to component B, and the applicable period of the mixture is approximately 4 hours. In a real application, this method of preparation can easily result in quality incidents such as inaccurate proportioning, uneven mixing, and exceeding applicable periods, which result in defective or failed bonds. (2) even though water-borne polyurethane emits no volatile organic compound, a significant amount of aerosol will still be generated during on-site construction, particularly during spraying. Therefore, ventilation equipment must be installed to ensure environmental protection. Nevertheless, when equipment such as water curtains are installed, water pollution issues also arise. (3) most activation temperatures for waterborne polyurethanes are between 50 and 70° C., and most of the water-borne isocyanate curing agents are modified aliphatic isocyanates. Therefore, it is difficult to achieve a high initial bond strength within a few minutes of heating and pressure curing, and the bonding of profiled surfaces is prone to fail due to rebound.

To conclude, it is necessary to develop a one-component heat-crosslinked water-borne polyurethane adhesive and the corresponding adhesive film. This adhesive can facilitate the preparation process and is stable under normal storage conditions; furthermore, it can be rapidly crosslinked when heated, thereby satisfying the requirements of a variety of bonding processes and environmental protection.

SUMMARY OF THE INVENTION

Consequently, the purpose of the present invention is to provide a heat-crosslinked polyurethane adhesive that overcome the shortcomings of the current technology.

To accomplish the above purpose, the technical scheme adopted in the present invention is: a heat-crosslinked polyurethane adhesive, which comprises the following components:

100 weight parts of a first waterborne resin;

8 to 12 weight parts of a first waterborne curing agent;

8 to 12 weight parts of a second waterborne resin;

4 to 10 weight parts of a second waterborne curing agent;

0.04 to 0.1 weight parts of a catalyst;

0.1 to 0.2 weight parts of a water-borne defoaming agent;

wherein the first water-borne resin is a water-borne polyurethane dispersion, the first water-borne curing agent is a physically blocked isocyanate curing agent, the second water-borne resin is a hydroxy polyurethane dispersion, the second water-borne curing agent is a chemically blocked isocyanate curing agent; the heat-crosslinked polyurethane adhesive further comprises a water-based thickener for adjusting its viscosity to 1000~5000 cps.

In an embodiment of the invention, the first water-borne resin is a sulfonic anionic water-borne polyurethane dispersion with a thermal activation temperature of 50~70° C.

In an embodiment of the invention, the first water-borne curing agent is a microcapsulated isocyanate curing agent.

In an embodiment of the invention, the second water-borne resin is a hydroxy polyurethane dispersion. It contains between 1.6 and 2.0% hydroxyl groups by weight of its solid composition.

In an embodiment of the invention, the second water-borne curing agent is an aliphatic blocked isocyanate curing agent with an NCO content of 11~13% by weight of its solid composition and an deblocking temperature of 100~120° C.

In an embodiment of the invention, the catalyst is a modified organotin catalyst with a weight-based addition of 1% of the mass of the second waterborne curing agent.

In an embodiment of the invention, the water-based thickener is a nonionic polyurethane associative thickening agent, the water-borne defoaming agent is a silicon-free defoaming agent.

Another purpose of the present invention is to provide a polyurethane adhesive film, which is made based on the above-mentioned heat-crosslinkable polyurethane adhesive.

The third purpose of the present invention is to provide a method for preparing the polyurethane adhesive film, includes the following steps:

(a) stirring the heat-crosslinked polyurethane adhesive evenly, and then defoaming treatment under vacuum;

(b) adding the heat-crosslinked polyurethane adhesive after defoaming treatment to coating machine, and applying it to surface of release film in accordance with the specified thickness;

(c) putting the output product of the step (b) in a drying tunnel and drying for 8~15 minutes at a temperature of 35 to 45° C. After cooling, wrapping the product in a protective film and rolling it up.

In an embodiment of the invention, the release film is a heavy peeling force type release film with a peeling force of 80 to 100 gf, and its material is PET or paper. The protective film is a PE-type protective film.

The above-mentioned thermally heat-crosslinked polyurethane adhesive and polyurethane adhesive film can be independently applied to the hot-pressing bonding of rigid-rigid material, rigid-flexible material, and flexible-flexible material, which can fulfill the design specifications for the bonding process and performance. The rigid material is PC, ABS or epoxy resin, and the flexible material is high-strength fabric (cloth).

Due to the application of the above-mentioned technical solutions, the present invention has the following advantages compared with the prior art. To begin, by precisely controlling the type and content of each component, the thermally cross-linked polyurethane adhesive (adhesive film) of the present invention can be used directly and stored for a long time at 25° C. or below. Secondly, the synergistic cooperation of the first water-borne resin and the first water-borne curing agent exhibits rapid curing under heat and pressure, thereby enhancing the initial bonding properties. Third, the addition of the second water-borne resin, the second water-borne curing agent and the catalyst significantly improves the permeability of adhesive film to porous fabric, allowing the film to be used simultaneously in the hot-pressing bonding of rigid-rigid materials, rigid-flexible materials, and flexible-flexible materials. Fourth of all, the combination of the second waterborne curing agent and the catalyst makes most of the second water-based curing agent participate in crosslinking during the hot-pressing process, while the uncrosslinked component exists in the form of a plasticizer and has no effect on the bonding properties. The residual second waterborne curing agent can still be unblocked and participate in crosslinking when the product is re-heated, thereby further enhancing bond strength and heat resistance.

EXAMPLES

The heat-crosslinked polyurethane adhesive of the present invention comprises the following components:

100 weight parts of a first waterborne resin;
8 to 12 weight parts of a first waterborne curing agent;
8 to 12 weight parts of a second waterborne resin;
4 to 10 weight parts of a second waterborne curing agent;
0.04 to 0.1 weight parts of a catalyst;
0.1 to 0.2 weight parts of a water-borne defoaming agent;
wherein the first water-borne resin is a water-borne polyurethane dispersion, the first water-borne curing agent is a physically blocked isocyanate curing agent, the second water-borne resin is a hydroxy polyurethane dispersion, the second water-borne curing agent is a chemically blocked isocyanate curing agent; the heat-crosslinked polyurethane adhesive further comprises a water-based thickener for adjusting its (heat-crosslinked polyurethane adhesive) viscosity to 1000~5000 cps (the amount of the water-based thickener is determined according to the viscosity of the final heat-crosslinked polyurethane adhesive).

By precisely controlling the types and contents of each component, the product can be used directly and stored for extended periods at 25° C. or below. The synergistic cooperation of the first water-borne resin and the first water-borne curing agent results in rapid curing under heat and pressure, improving initial bonding properties. The addition of the second water-borne resin, the second water-borne curing agent and the catalyst significantly improves the permeability of adhesive film to porous fabric, allowing the film to be used simultaneously in the hot-pressing bonding of rigid-rigid materials, rigid-flexible materials, and flexible-flexible materials. The rigid material is PC, ABS or epoxy resin, and the flexible material is high-strength fabric. The combination of the second waterborne curing agent and the catalyst causes the majority of the second water-based curing agent to crosslink during the hot-pressing process, while the uncrosslinked component exists as a plasticizer and has no effect on the bonding properties. When the product is re-heated, the residual second waterborne curing agent can be unblocked and participate in crosslinking, enhancing bond strength and heat resistance even further.

The first water-borne resin is a sulfonic anionic water-borne polyurethane dispersion with a thermal activation temperature of 50~70° C. One or more of the following water-borne polyurethane dispersions can be selected: including Dispercoll U53, U54, U56, U58, etc. from Covestro, Germany; and PUD-3301, etc. from Jiangsu OSiC Performance Materials Co., Ltd., China.

The first water-borne curing agent is a physically blocked isocyanate curing agent, which takes the form of an aqueous suspension and micronized particles. Preferably, a microcapsulated curing agent is chosen. The above-mentioned isocyanates are polyisocyanates, which include aliphatic, alicyclic, heterocyclic and aromatic polyisocyanates. Preferably, the aromatic polyisocyanate is chosen. The following is an example of the preparation of microencapsulated curing agents for this application. The TDI was mixed with the catalyst at room temperature, while the catalyst can be diaminopyridine, tributylphosphorus, pyridine and etc. The mixture is then slowly dropped into ice water containing an emulsifier and dispersed at a high rate to form small droplets that are uniform in size.

The aqueous solution of amine, where the amine is diamine or triamine, with a mass concentration of 1 to 10%, is slowly added into the mixture and stirred for 2 hours to obtain a microencapsulate dispersion. The formed "shell" structure encapsulates the active NCO groups and coexists for an extended period of time with water, hydroxyl groups, and other groups. After being heated and compressed, the "shell" structure is broken breaks down to release active NCO groups, causing a cross-linking reaction. The first water-borne curing agent also exhibits rapid curing under heat and pressure, which is advantageous for achieving the initial bonding performance and particularly suited for bonding surfaces with unusual shapes. Specifically, the BL1041 series products provided by Jiangsu OSiC Performance Materials Co., Ltd. are selected.

The second water-borne resin is a hydroxy polyurethane dispersion, which can be one or more of the following: Bayhydrol U2757, U2750, U2787, etc. from Covestro, Germany; OH-PUD-903, OH-PUD-1936 from Shanghai Siwo Chemical etc. Generally speaking, a low hydroxyl content does not significantly increase the permeability to the fabric, whereas a high hydroxyl content significantly increases the fabric's permeability but may also reduce initial adhesion and consume more costly isocyanate curing agents. Optimal hydroxyl content is between 1.6% and 2.0% by mass of solid content.

The second water-borne curing agent is a chemically blocked isocyanate curing agent. The polyisocyanate used in water-based system must be hydrophilically modified. The modification method is to introduce hydrophilic groups, such as a hydrophilic polyethylene glycol ether, to the crosslinking agent molecule. A blocking agent is then added to the hydrophilically treated isocyanate crosslinking agent to seal the active group NCO, which coexists with water, hydroxyl groups, and other groups at room temperature and is released to participate in the crosslinking reaction upon heating. The conventional preparation method is as follows: after hydrophilic treatment of HDI trimer, diethyl malonate (DEM), 3,5-dimethylpyrazole (DMP) are used as blocking agent to block NCO, then water-borne blocking curing agent with deblocking temperature of 100~120° C. is obtained. The following second water-borne curing agent can be selected: including Imprafix 2794 and bayhydur BL2867 from Covestro, Germany, Trixene BI 7986 and BI7887 etc.

from Bassington, UK. NCO mass content is about 11~13% (in terms of solid content). Specifically, Imprafix 2794 from Covestro was selected.

The catalyst is a modified organotin catalyst, which can reduce activation energy required for the deblocking reaction, lower deblocking temperature, facilitate rapid progress of the deblocking reaction and help the second water-borne curing agent to participate in the cross-linking reaction during thermal pressing process. Dibutyltin dilaurate (DBDTL) is one of the excellent catalysts for polyurethane reaction. However, DBDTL is insoluble in water and must be specially modified before it can be used in water-based systems, such as LH10 provided by OMG Borchers of Germany. The use of the catalyst may reduce the storage stability, specifically, the addition amount of 1 wt % of the second waterborne curing agent simultaneously satisfies the catalysis and storage requirements.

The water-based thickener is a non-ionic polyurethane thickening agent, such as Borchi Gel L75N, Gel 0434 and Gel 0620 provided by OMG Borchers, Rheo WT203, WT204 etc. provided by Deqian company. Specifically, L75N is selected.

The water-borne defoaming agent is a non-organosilicon type defoaming agent, such as Surfynol DF-37, DF-110D and 118 etc. provided by Evonik Company. Specifically, 118 is selected.

The heat-crosslinked polyurethane adhesive obtained by combining the aforementioned components can be utilized for thermal compression bonding of rigid-rigid material, rigid-flexible material, and flexible-flexible material, thereby meeting the requirements of bonding process and designed adhesive performance. The rigid material is PC, ABS or epoxy resin, and the flexible material is high-strength fabric.

The polyurethane adhesive film of the present invention is made based on the heat-crosslinked polyurethane adhesive mentioned above. The method for preparing the polyurethane adhesive film, includes the following steps: (a) stirring the heat-crosslinked polyurethane adhesive evenly, and then defoaming treatment under vacuum. Long-term storage may cause the adhesive to stratify, necessitating the application of slow stirring; (b) adding the heat-crosslinked polyurethane adhesive after defoaming treatment (be filtrated through 100 mesh filter before adding) to coating machine, and applying it to surface of release film in accordance with the specified thickness; (c) putting the product of the step (b) in a drying tunnel and drying for 8 to 15 minutes at a temperature of 35~45° C. After cooling, wrap the product in a protective film and roll it up. The release film is a heavy peeling force type release film with a peeling force of 80 to 100 gf, and its material is PET or paper; the protective film is a PE protective film.

Preferred embodiments of the present invention will be described in detail.

Example 1 to 18

Example 1 to 18 respectively provide a heat-crosslinked polyurethane adhesives, a heat-crosslinked polyurethane adhesive film (also named polyurethane adhesive film) and preparation method therefor. They components' types and usage are shown in Table 1 and Table 2.

TABLE 1

| Example NO. | | 1 | 2 | 3 | 4 | 5 | 6 | 7 | 8 | 9 |
|---|---|---|---|---|---|---|---|---|---|---|
| first resin (g) | U54 | 100 | 100 | 100 | 100 | 100 | 100 | 100 | 100 | 100 |
| | PUD-3301 | / | / | / | / | / | / | / | / | / |
| first curing agent (g) | BL1041 | 8 | 8 | 8 | 10 | 10 | 10 | 12 | 12 | 12 |
| second resin (g) | OH-PUD-903 (OH % = 1.2%) | / | / | / | / | / | / | / | / | / |
| | U2757 (OH % = 1.9%) | 8 | 8 | 8 | 10 | 10 | 10 | 12 | 12 | 12 |
| | U2750 (OH % = 3.6%) | / | / | / | / | / | / | / | / | / |
| second curing agent (g) | 2794 | 4 | 7 | 10 | 4 | 7 | 10 | 4 | 7 | 10 |
| catalyst (g) | LH10 | 0.04 | 0.07 | 0.1 | 0.04 | 0.07 | 0.1 | 0.04 | 0.07 | 0.1 |
| water-based thickener (g) | L75N | 0.2 | 0.2 | 0.2 | 0.2 | 0.2 | 0.2 | 0.2 | 0.2 | 0.2 |
| water-borne defoaming agent (g) | 118 | 0.1 | 0.20 | 0.15 | 0.1 | 0.1 | 0.1 | 0.1 | 0.1 | 0.1 |

TABLE 2

| Example NO. | | 10 | 11 | 12 | 13 | 14 | 15 | 16 | 17 | 18 |
|---|---|---|---|---|---|---|---|---|---|---|
| first resin (g) | U54 | / | / | / | / | / | / | / | / | / |
| | PUD-3301 | 100 | 100 | 100 | 100 | 100 | 100 | 100 | 100 | 100 |
| first curing agent (g) | BL 1041 | 8 | 8 | 8 | 10 | 10 | 10 | 12 | 12 | 12 |
| second resin (g) | OH-PUD-903 (OH % = 1.2%) | / | / | / | / | / | / | / | / | / |
| | U2757 (OH % = 1.9%) | 8 | 8 | 8 | 10 | 10 | 10 | 12 | 12 | 12 |
| | U2750 (OH % = 3.6%) | / | / | / | / | / | / | / | / | / |

TABLE 2-continued

| Example NO. | | 10 | 11 | 12 | 13 | 14 | 15 | 16 | 17 | 18 |
|---|---|---|---|---|---|---|---|---|---|---|
| second curing agent (g) | 2794 | 4 | 7 | 10 | 4 | 7 | 10 | 4 | 7 | 10 |
| catalyst (g) | LH10 | 0.04 | 0.07 | 0.1 | 0.04 | 0.07 | 0.1 | 0.04 | 0.07 | 0.1 |
| water-based thickener (g) | L75N | 0.2 | 0.2 | 0.2 | 0.2 | 0.2 | 0.2 | 0.2 | 0.2 | 0.2 |
| water-borne defoaming agent (g) | 118 | 0.1 | 0.2 | 0.15 | 0.1 | 0.15 | 0.1 | 0.1 | 0.15 | 0.1 |

The preparation method of the heat-crosslinked polyurethane adhesives above is as follows. In proportion, the first waterborne resin, the second waterborne resin, the first waterborne curing agent, the second waterborne curing agent, and the catalyst are added to the mixing kettle. After half an hour of stirring, the water-based thickener is gradually added to the mixture, which is then evenly stirred and mixed to achieve a viscosity of 1000 to 5000 cps. Following the addition of the water-based defoamer, the mixture is slowly stirred for 0.3 to 0.8 hours before being filtered through a 100 to 200 mesh screen. The entire preparation procedure is conducted at room temperature, and the system temperature is guaranteed to be equal or less than 35° C.

The above-mentioned heat-crosslinking polyurethane adhesive can prepare a corresponding heat-crosslinking polyurethane adhesive film. The preparation method includes the following steps: (a) s stirring the heat-crosslinked polyurethane adhesive evenly, and then defoaming treatment under vacuum. Long-term storage may cause the adhesive to stratify, necessitating the application of slow stirring; (b) adding the heat-crosslinked polyurethane adhesive after defoaming treatment (be filtrated through 100 mesh filter before adding) to coating machine, and applying it to surface of release film in accordance with the specified thickness; (c) putting the product of the step (b) in a drying tunnel and drying at about 40° C. for 10 minutes. After cooling, wrap the product in a protective film and roll it up.

Comparative Example 1 to 15

Comparative example 1 to 15 respectively provide a heat-crosslinked polyurethane adhesives, heat-crosslinked polyurethane adhesive film (also named polyurethane adhesive film) and preparation method therefor. They components' types and usage are shown in Table 3 and Table 4. The specific method conforms to those of examples 1 to 18.

TABLE 3

| Comparative example NO. | | 1 | 2 | 3 | 4 | 5 | 6 | 7 | 8 | 9 |
|---|---|---|---|---|---|---|---|---|---|---|
| first resin (g) | U54 | 100 | 100 | 100 | 100 | 100 | 100 | 100 | 100 | 100 |
| | PUD-3301 | / | / | / | / | / | / | / | / | / |
| first curing agent (g) | BL1041 | 8 | 10 | 12 | 10 | 10 | 10 | 4 | 4 | 4 |
| second resin (g) | OH-PUD-903 (OH % = 1.2%) | / | / | / | / | / | / | / | / | / |
| | U2757 (OH % = 1.9%) | / | / | / | 5 | 5 | 5 | 10 | 10 | 10 |
| | U2750 (OH % = 3.6%) | / | / | / | / | / | / | / | / | / |
| second curing agent (g) | 2794 | / | / | / | 4 | 7 | 10 | 4 | 7 | 10 |
| catalyst (g) | LH10 | / | / | / | 0.04 | 0.07 | 0.1 | 0.04 | 0.07 | 0.1 |
| water-based thickener (g) | L75N | 0.2 | 0.2 | 0.2 | 0.2 | 0.2 | 0.2 | 0.2 | 0.2 | 0.2 |
| water-borne defoaming agent (g) | 118 | 0.1 | 0.1 | 0.1 | 0.1 | 0.1 | 0.1 | 0.1 | 0.1 | 0.1 |

TABLE 4

| Comparative example NO. | | 10 | 11 | 12 | 13 | 14 | 15 |
|---|---|---|---|---|---|---|---|
| first resin (g) | U54 | 100 | 100 | 100 | 100 | 100 | 100 |
| | PUD-3301 | / | / | / | / | / | / |
| first curing agent (g) | BL 1041 | 10 | 10 | 10 | 10 | 10 | 10 |
| second resin (g) | OH-PUD-903 (OH % = 1.2%) | 8 | 10 | 12 | / | / | / |
| | U2757 (OH % = 1.9%) | / | / | / | / | / | / |
| | U2750 (OH % = 3.6%) | / | / | / | 8 | 10 | 12 |

TABLE 4-continued

| Comparative example NO. | | 10 | 11 | 12 | 13 | 14 | 15 |
|---|---|---|---|---|---|---|---|
| second curing agent (g) | 2794 | 4 | 4 | 4 | 4 | 4 | 4 |
| catalyst (g) | LH10 | 0.04 | 0.04 | 0.04 | 0.04 | 0.04 | 0.04 |
| water-based thickener (g) | L75N | 0.2 | 0.2 | 0.2 | 0.2 | 0.2 | 0.2 |
| water-borne defoaming agent (g) | 118 | 0.1 | 0.1 | 0.1 | 0.1 | 0.1 | 0.1 |

The performance test of the above products is as follows:

1. The peel strength test method is as follows:

(a) Bonding Structure:

High tear strength polyester fabric/adhesive film (thickness 0.05 mm)/polycarbonate PC board (thickness 0.6 mm).

(1) Pre-press the adhesive film to the surface of the high tear strength polyester fabric, the pre-pressing condition is 80° C. and a time of 10 seconds.

(2) Place the PC board and the polyester fabric pre-pressed with the adhesive film in a hot-press machine with a temperature of 110° C. a time of 90 seconds, and a pressure of 0.5 MPa.

(3) Place the sample at room temperature for more than 2 days and conduct a peel strength test according to GB/T 2791-1995. Table 5 displays the test outcomes.

(b) Bonding Structure:

Polycarbonate PC board/adhesive film (thickness 0.05 mm)/Polycarbonate PC board (thickness 0.6 mm).

(1) Pre-press the adhesive film to the PC surface, the pre-press condition is 80° C. and a time of 10 seconds.

(2) Place another PC board and the PC board pre-pressed with adhesive film in a hot-press machine with a temperature of 110° C., a time of 90 seconds, and a pressure of 0.5 MPa.

(3) Place the sample at room temperature for more than 2 days and conduct a peel strength test according to GB/T 2791-1995. Table 5 displays the test outcomes.

2. Storage period:

The heated cross-linked polyurethane adhesive (abbreviated as water-borne adhesive) and the heated cross-linked polyurethane adhesive film (abbreviated as adhesive film) were exposed to air in normal packaging mode without air isolation for 6 months at 10~25° C., and the peel strength was tested according to the above method. The results are shown in Table 6.

TABLE 5

| Adhesion peel strength test (N/cm) | | | | | |
|---|---|---|---|---|---|
| | bonding structure:PC/adhesive membrane/PC | bonding structure:Polyester fabric/adhesive film/PC | | bonding structure:PC/adhesive membrane/PC | bonding structure:Polyester fabric/adhesive film/PC |
| Example 1 | 46.7 | 35.7 (Adhesive attached on the surface of the fabric) | Comparative example 1 | 52.4 | 5.6 (No adhesive attached on fabric surface) |
| Example 2 | 48.1 | 36.4 (Adhesive attached on the surface of the fabric) | Comparative example 2 | 55.9 | 7.3 (No adhesive attached on fabric surface) |
| Example 3 | 47.9 | 35.9 (Adhesive attached on the surface of the fabric) | Comparative example 3 | 55.7 | 4.9 (No adhesive attached on fabric surface) |
| Example 4 | 48.1 | 37.5 (Adhesive attached on the surface of the fabric) | Comparative example 4 | 44.5 | 15.7 (No adhesive attached on fabric surface) |
| Example 5 | 49.3 | 38.3 (Adhesive attached on the surface of the fabric) | Comparative example 5 | 46.4 | 18.4 (No adhesive attached on fabric surface) |
| Example 6 | 46.9 | 35.1 (Adhesive attached on the surface of the fabric) | Comparative example 6 | 47.4 | 21.3 (No adhesive attached on fabric surface) |
| Example 7 | 45.3 | 35.5 (Adhesive attached on the surface of the fabric) | Comparative example 7 | 25.1 | 20.8 (A small amount of adhesive attached on the surface of the fabric) |
| Example 8 | 48.3 | 36.3 (Adhesive attached on the surface of the fabric) | Comparative example 8 | 27.9 | 22.4 (A small amount of adhesive attached on the surface of the fabric) |
| Example 9 | 46.8 | 34.5 (Adhesive attached on the surface of the fabric) | Comparative example 9 | 28.4 | 24.3 (A small amount of adhesive attached on the surface of the fabric) |
| Example 10 | 46.2 | 34.6 (Adhesive attached on the surface of the fabric) | Comparative example 10 | 45.3 | 25.9 (A small amount of adhesive attached on the surface of the fabric) |

TABLE 5-continued

| Adhesion peel strength test (N/cm) | | | | | |
|---|---|---|---|---|---|
| | bonding structure:PC/ adhesive membrane/PC | bonding structure:Polyester fabric/adhesive film/PC | | bonding structure:PC/ adhesive membrane/PC | bonding structure:Polyester fabric/adhesive film/PC |
| Example 11 | 48.5 | 38.3 (Adhesive attached on the surface of the fabric) | Comparative example 11 | 43.8 | 26.4 (A small amount of adhesive attached on the surface of the fabric) |
| Example 12 | 48.2 | 36.2 (Adhesive attached on the surface of the fabric) | Comparative example 12 | 42.6 | 28.3 (A small amount of adhesive attached on the surface of the fabric) |
| Example 13 | 45.7 | 35.9 (Adhesive attached on the surface of the fabric) | Comparative example 13 | 33.5 | 30.1 (Adhesive attached on the surface of the fabric) |
| Example 14 | 49.7 | 38.3 (Adhesive attached on the surface of the fabric) | Comparative example 14 | 31.4 | 32.4 (Adhesive attached on the surface of the fabric) |
| Example 15 | 46.4 | 35.3 (Adhesive attached on the surface of the fabric) | Comparative example 15 | 30.4 | 33.3 (Adhesive attached on the surface of the fabric) |
| Example 16 | 47.6 | 35.9 (Adhesive attached on the surface of the fabric) | | | |
| Example 17 | 48.1 | 36.7 (Adhesive attached on the surface of the fabric) | | | |
| Example 18 | 46.4 | 35.3 (Adhesive attached on the surface of the fabric) | | | |

The following statements can be concluded from the results of Table 5. (1) Examples 1 to 18 demonstrate that the peeling force of PC/adhesive film/PC is ≥40 N/cm; the peeling force of PC/adhesive film/polyester fabric is ≥33 N/cm, thereby meeting the design specifications. (2) By comparing examples 1 to 9 with examples 10 to 18, it can be concluded the performance of the first waterborne resin U54 is comparable to that of 3301. (3) Comparative examples 1~3 and 4~6 show that when no or little amount of the second water-borne resin, the second water-borne curing agent and the catalyst is added, the adhesive has poor penetration into the polyester fabric, and no adhesive remains adhered to the fabric surface after peeling, allowing the adhesive film to be used in PC/adhesive film/PC thermal compression bonding. (4) Comparative examples 7~9 show that when the first water-borne curing agent is less than the lower limit, the strength of adhesive film after hot-pressing curing is low. (5) Comparative examples 10~12 show that the addition of the second water-borne resin with a low hydroxyl content cannot significantly increase the permeability to the fabric, and the fabric is basically free of adhesive when peeled off. (6) Comparative examples 13 to 15 show that the addition of a second waterborne resin with a high hydroxyl content can increase the fabric's permeability. However, it also results in a low concentration of waterborne curing agent, causing a low body strength after hot-pressing.

TABLE 6

| | Adhesion peel strength test after storage (N/cm) | | | |
|---|---|---|---|---|
| | water-borne adhesive is stored for 6 months before forming a film | | adhesive film is stored for 6 months | |
| | bonding structure:PC/ adhesive membrane/PC | bonding structure:Polyester fabric/adhesive film/PC | bonding structure:PC/ adhesive membrane/PC | bonding structure:Polyester fabric/adhesive film/PC |
| Example 1 | 45.4 | 37.5 (Adhesive attached on the surface of the fabric) | 45.1 | 36.3 (Adhesive attached on the surface of the fabric) |
| Example 2 | 48.8 | 37.8 (Adhesive attached on the surface of the fabric) | 47.3 | 38.3 (Adhesive attached on the surface of the fabric) |
| Example 3 | 46.9 | 35.1 (Adhesive attached on the surface of the fabric) | 46.3 | 36.0 (Adhesive attached on the surface of the fabric) |
| Example 4 | 47.3 | 36.7 (Adhesive attached on the surface of the fabric) | 47.7 | 36.5 (Adhesive attached on the surface of the fabric) |

TABLE 6-continued

| | Adhesion peel strength test after storage (N/cm) | | | |
|---|---|---|---|---|
| | water-borne adhesive is stored for 6 months before forming a film | | adhesive film is stored for 6 months | |
| | bonding structure:PC/ adhesive membrane/PC | bonding structure:Polyester fabric/adhesive film/PC | bonding structure:PC/ adhesive membrane/PC | bonding structure:Polyester fabric/adhesive film/PC |
| Example 5 | 49.0 | 37.4 (Adhesive attached on the surface of the fabric) | 49.3 | 38.1 (Adhesive attached on the surface of the fabric) |
| Example 6 | 47.9 | 35.6 (Adhesive attached on the surface of the fabric) | 47.3 | 35.4 (Adhesive attached on the surface of the fabric) |
| Example 7 | 44.3 | 35.9 (Adhesive attached on the surface of the fabric) | 45.1 | 35.5 (Adhesive attached on the surface of the fabric) |
| Example 8 | 47.8 | 36.7 (Adhesive attached on the surface of the fabric) | 47.3 | 36.9 (Adhesive attached on the surface of the fabric) |
| Example 9 | 46.4 | 35.9 (Adhesive attached on the surface of the fabric) | 46.0 | 35.6 (Adhesive attached on the surface of the fabric) |
| Example 10 | 45.8 | 35.6 (Adhesive attached on the surface of the fabric) | 47.4 | 36.9 (Adhesive attached on the surface of the fabric) |
| Example 11 | 47.3 | 38.0 (Adhesive attached on the surface of the fabric) | 47.5 | 38.3 (Adhesive attached on the surface of the fabric) |
| Example 12 | 48.4 | 37.2 (Adhesive attached on the surface of the fabric) | 48.8 | 37.4 (Adhesive attached on the surface of the fabric) |
| Example 13 | 44.7 | 35.2 (Adhesive attached on the surface of the fabric) | 47.4 | 35.8 (Adhesive attached on the surface of the fabric) |
| Example 14 | 48.3 | 37.5 (Adhesive attached on the surface of the fabric) | 47.9 | 38.2 (Adhesive attached on the surface of the fabric ) |
| Example 15 | 46.1 | 35.7 (Adhesive attached on the surface of the fabric) | 45.9 | 35.6 (Adhesive attached on the surface of the fabric) |
| Example 16 | 46.7 | 35.3 (Adhesive attached on the surface of the fabric) | 47.3 | 35.3 (Adhesive attached on the surface of the fabric) |
| Example 17 | 47.9 | 35.8 (Adhesive attached on the surface of the fabric) | 48.0 | 36.1 (Adhesive attached on the surface of the fabric) |
| Example 18 | 46.0 | 35.7 (Adhesive attached on the surface of the fabric) | 45.7 | 35.8 (Adhesive attached on the surface of the fabric) |

The following statements can be concluded from Table 6: (1) After six months of storage of the waterborne adhesive prior to film formation and another six months of storage of the formed adhesive film, there is no discernible change in bonding performance, which satisfies the design requirements for a 6-month shelf life. (2) No storage test was performed on comparative examples 1 to 15 because their bonding performance did not meet design specifications.

The above-mentioned embodiments are only intended to illustrate the technical concept and characteristics of the present invention, and the purpose thereof is to enable those who are familiar with the art to understand the content of the present invention and implement them accordingly, and cannot limit the protection scope of the present invention. All equivalent changes or modifications made according to the spirit of the present invention should be included within the protection scope of the present invention.

What is claimed is:

1. A heat-crosslinked polyurethane adhesive comprising the following components:

100 weight parts of a first waterborne resin;

8 to 12 weight parts of a first waterborne curing agent;

8 to 12 weight parts of a second waterborne resin;

4 to 10 weight parts of a second waterborne curing agent;

0.04 to 0.1 weight parts of a catalyst;

1 to 0.2 weight parts of a water-borne defoaming agent;

wherein the first water-borne resin is a water-borne polyurethane dispersion, the first water-borne curing agent is a physically blocked isocyanate curing agent, the second water-borne resin is a hydroxy polyurethane dispersion, the second water-borne curing agent is a chemically blocked isocyanate curing agent; wherein the heat-crosslinked polyurethane adhesive further comprises a water-based thickener for adjusting its viscosity to 1000-5000 cps; the first water-borne resin is a sulfonic anionic water-borne polyurethane dispersion with a thermal activation temperature of 50-70° C., the second water-borne resin is a hydroxy polyurethane dispersion which contains between 1.6 and 2.0% hydroxyl groups by weight of its solid composition; the first water-borne curing agent is a microcapsulated isocyanate curing agent, which is a microcapsule dispersion formed by dispersing TDI and amine aqueous solution in an emulsifier under action of microcapsule catalyst.

2. The heat-crosslinked polyurethane adhesive of claim 1, wherein the second water-borne curing agent is an aliphatic blocked isocyanate curing agent with an NCO content of 11-13% by weight of its solid composition and a deblocking temperature of 100-120° C.

3. The heat-crosslinked polyurethane adhesives of claim 1, wherein the catalyst is an modified organotin catalyst with a weight-based addition of 1% of the mass of the second waterborne curing agent.

4. The heat-crosslinked polyurethane adhesive of claim 1, wherein the water-based thickener is a nonionic polyurethane associative thickening agent, the water-borne defoaming agent is a silicon-free defoaming agent.

5. A polyurethane adhesive film, wherein the polyurethane adhesive film is made based on the heat-crosslinked polyurethane adhesive of claim 1.

6. A preparation method of the polyurethane adhesive film of claim 5, wherein includes the following steps:

(a) stirring the heat-crosslinked polyurethane adhesive evenly, and then defoaming treatment under vacuum;

(b) adding the heat-crosslinked polyurethane adhesive after defoaming treatment to coating machine, and applying it to surface of release film in accordance with the specified thickness;

(c) putting the product of the step (b) in drying tunnel and drying at 35-45° C. for 8-15 minutes; after cooling, wrapping the product in a protective film and rolling it up.

7. The preparation method of the polyurethane adhesive film of claim 6, wherein the release film is a heavy peeling force type release film with a peeling force of 80 to 100 gf, and its material is PET or paper; the protective film is a PE protective film.

* * * * *